United States Patent [19]

Ng

[11] Patent Number: 4,646,261
[45] Date of Patent: Feb. 24, 1987

[54] LOCAL VIDEO CONTROLLER WITH VIDEO MEMORY UPDATE DETECTION SCANNER

[75] Inventor: Ed C. Ng, San Jose, Calif.

[73] Assignee: Motorola Computer Systems, Inc., Cupertino, Calif.

[21] Appl. No.: 536,912

[22] Filed: Sep. 27, 1983

[51] Int. Cl.[4] .................... G06F 3/153; G09G 1/14
[52] U.S. Cl. ........................... 364/900; 340/750
[58] Field of Search ............. 340/717, 721, 724, 750, 340/799, 723; 364/200 MS File, 900 MS File, 521

[56] References Cited

U.S. PATENT DOCUMENTS

| | | | |
|---|---|---|---|
| 3,792,462 | 2/1974 | Casey | 340/750 |
| 3,956,739 | 5/1976 | Ophir | 364/900 |
| 4,070,710 | 1/1978 | Sukonick | 364/900 |
| 4,074,254 | 2/1978 | Belser | 364/900 |
| 4,119,953 | 10/1978 | Yeschick | 340/750 |
| 4,204,206 | 5/1980 | Bakula | 340/721 |
| 4,278,973 | 7/1981 | Hughes | 340/721 |
| 4,412,294 | 10/1983 | Watts | 364/521 |
| 4,442,504 | 4/1984 | Dummermuth | 364/900 |

Primary Examiner—Archie E. Williams, Jr.
Assistant Examiner—Florin Munteanu-Ramnic
Attorney, Agent, or Firm—Walter W. Nielsen

[57] ABSTRACT

In a system including a central processor, central memory, and local video controller communicating with a video terminal, the video terminal including a terminal processor and a video memory for storing video information for displaying on the terminal screen, a change detect circuit is provided in the local video controller for detecting whenever a change has occurred in that portion of the central memory containing video information to be displayed on the terminal's video screen. Responsive to the change detect circuit, the local video controller sends updated video information to the video memory at the terminal.

The change detect circuit reduces the workload on the system by sending only the updated video information to the terminal.

The change detect circuit is capable of operation with a system employing multiple terminals each having multiple independent screen display areas.

2 Claims, 11 Drawing Figures

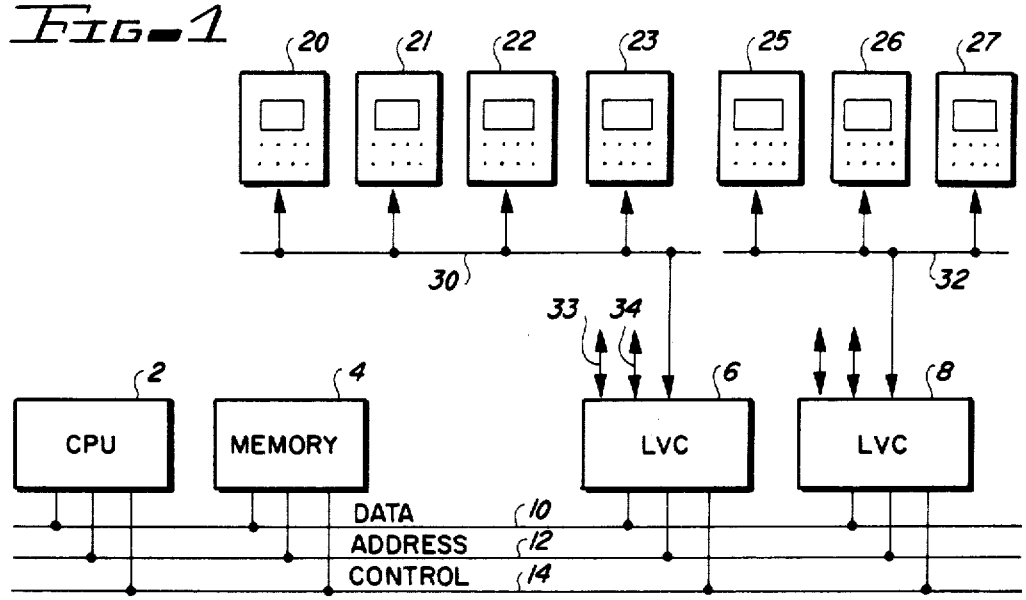

FIG-1

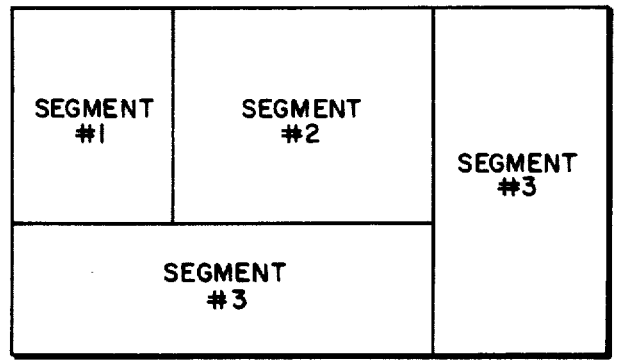

FIG-3

| | 0 | 1 | 2 | 3 | 4 | 5 | 6 | 7 | 8 | 9 | 1 | 11 | 12 | 13 | 14 | 15 | 16 | 17 | 18 | 19 | 2 | 21 | 22 | 23 |
|---|---|---|---|---|---|---|---|---|---|---|---|---|---|---|---|---|---|---|---|---|---|---|---|---|
| 0 | C | \multicolumn{7}{l}{S1 OR rr} | \multicolumn{8}{l}{S2 OR rr} | \multicolumn{8}{l}{CS} |
| 1 | \multicolumn{24}{l}{UCB ADDRESS} |
| 2 | \multicolumn{24}{l}{NEXT UCB ADDRESS} |
| 3 | I | \multicolumn{3}{l}{rr} | \multicolumn{4}{l}{UCBS} | \multicolumn{4}{l}{rr} | \multicolumn{12}{l}{CCODE} |
| 4 | \multicolumn{16}{l}{rr} | \multicolumn{8}{l}{PDA} |
| 5 | \multicolumn{24}{l}{DATA BLOCK POINTER} |
| 6 | \multicolumn{24}{l}{DATA BLOCK SIZE IN BYTES} |
| 7 | \multicolumn{24}{l}{BYTES TRANSFERRED} |
| 8 | \multicolumn{18}{l}{COMMAND PARAMETERS} | \multicolumn{3}{l}{rr} | \multicolumn{3}{l}{✶✶✶} |
| 9 | \multicolumn{24}{l}{COMMAND PARAMETERS} |
| | \multicolumn{24}{c}{• • •} |
| 15 | \multicolumn{24}{l}{COMMAND PARAMETERS} |

FIG-8

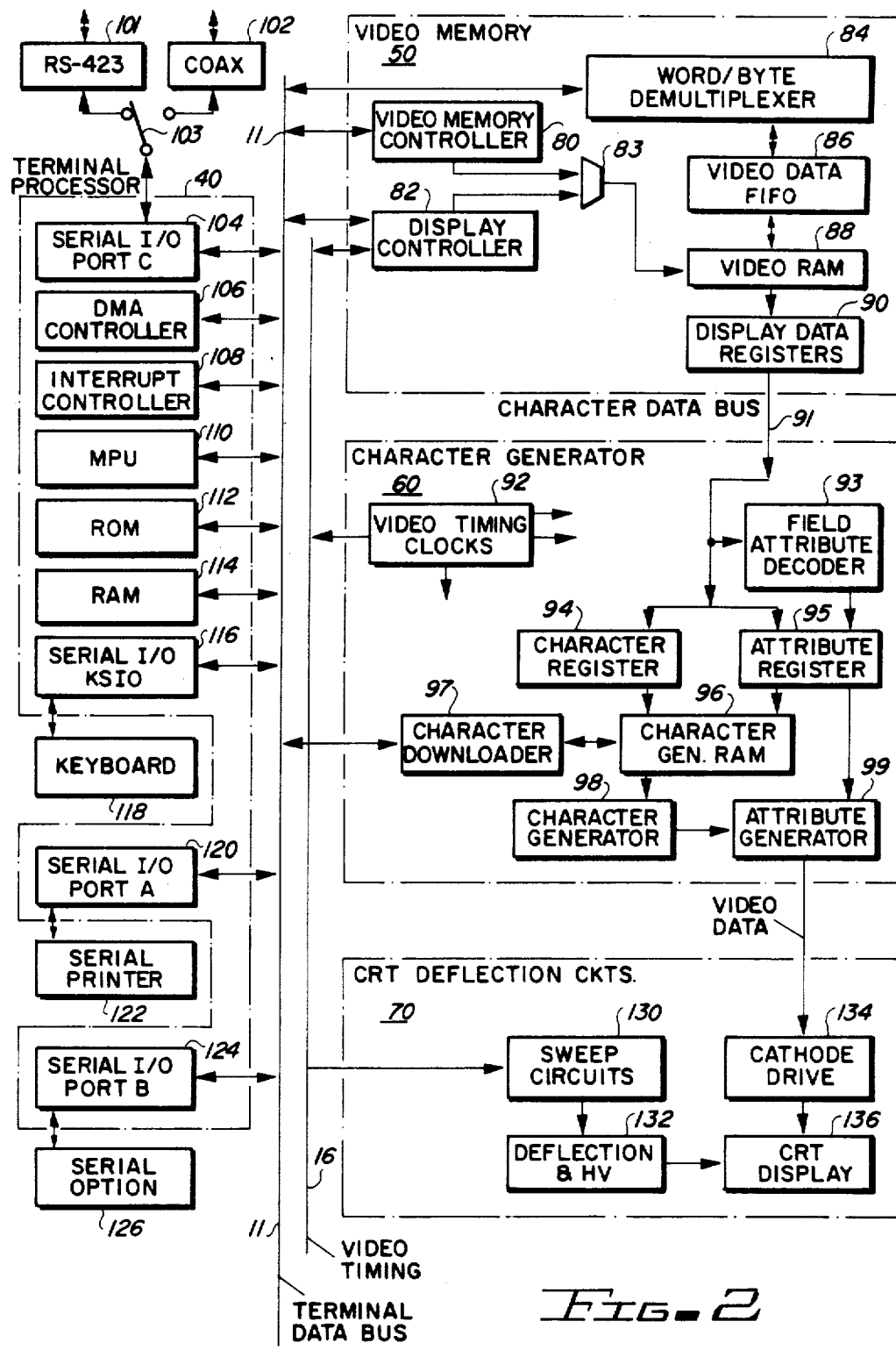

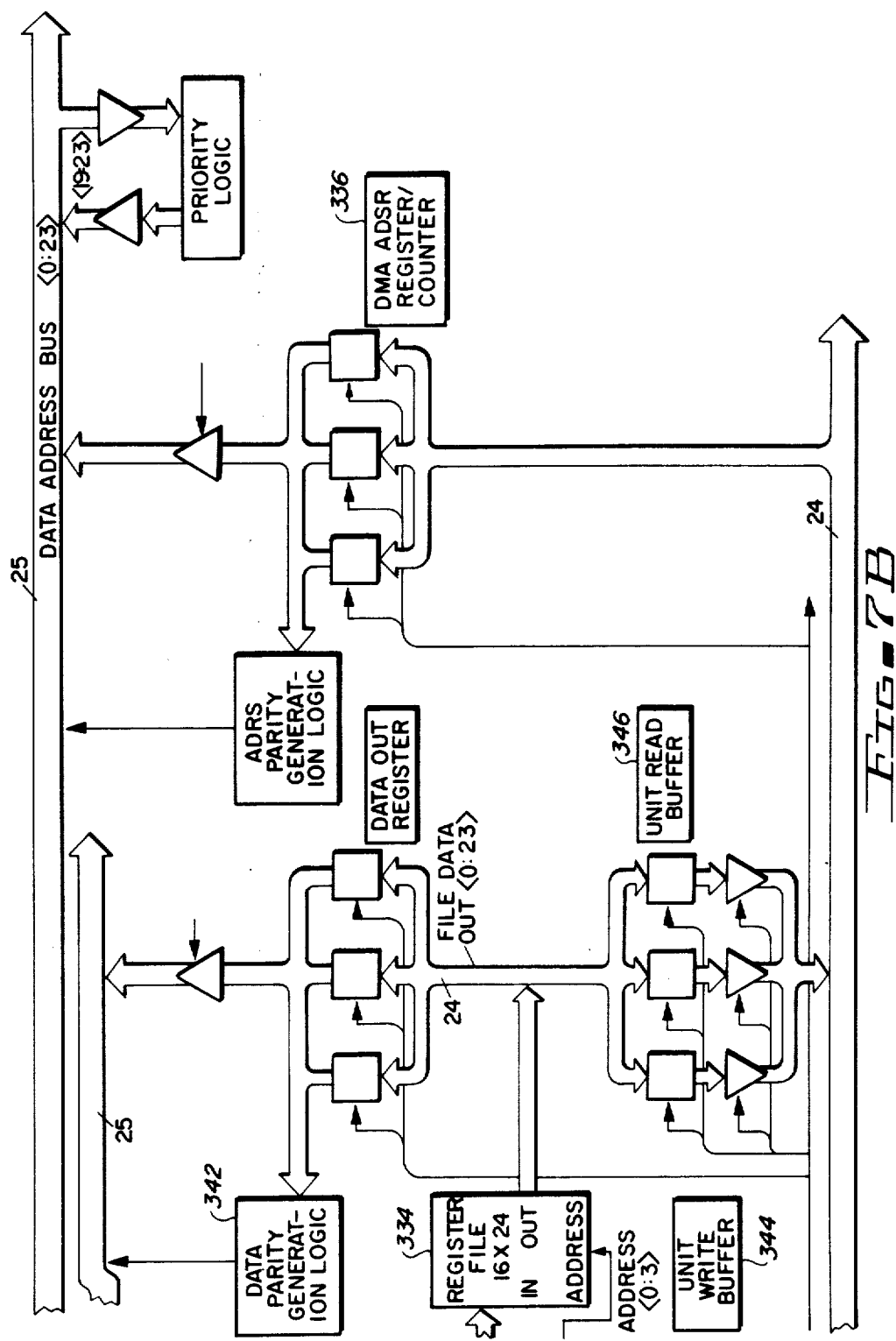

LOCAL VIDEO CONTROLLER WITH VIDEO MEMORY UPDATE DETECTION SCANNER

RELATED INVENTIONS

Video Memory Controller, invented by M. Lavelle, U.S. Ser. No. 536,911, filed on even date herewith and assigned to the assignee of the present invention.

Video Update FIFO Buffer, invented by C. Goldsmith et al., U.S. Ser. No. 536,913, filed on even date herewith and assigned to the assignee of the present invention.

TECHNICAL FIELD

This invention relates generally to a data processing system, and, in particular, to a terminal controller in a computer central system.

BACKGROUND OF THE INVENTION

The present invention concerns an improvement to a central system controller interfacing a central processor and central memory with one or more local terminals.

It is known in the data processing arts to provide a multi-terminal data processing system in which a central processor and large central memory are shared by a number of intelligent terminals. User application programs and data are stored in the central memory. The central processor provides time-multiplexed access to the central memory by the terminals and may provide inter-terminal communications.

As an interface between the central system and the terminals, the central system contains at least one terminal communications controller, which in the ensuing description will be referred to as a "local video controller" (LVC). In a preferred embodiment of the invention, the central system can support four LVC's. Each LVC can control 8 channels, each of which can handle communications with up to 8 terminals.

Each intelligent terminal contains a keyboard for the entry of data and commands and a video display unit for displaying information to the user.

In such a data processing system it is desirable to minimize the time that the central processor spends servicing each terminal, since by minimizing this time the size of the central processor may be kept relatively small. Alternatively, relatively more terminals may be serviced from the central processor.

It is known to provide "intelligence" at each terminal in the form of one or more terminal processors, terminal memories, and associated circuitry, in order to reduce the workload on the central processor. The terminal processor ordinarily requires at least some terminal memory to store routines and data to perform its various functions, which may include power-up and bootloading, keyboard input, video display, printing, and communicating.

To reduce the workload on the terminal processor, it is known to improve terminal processor throughput by providing a separate video memory for storing data to be displayed on the screen. This avoids the necessity of the terminal processor sharing its memory workspace with the video display memory and consequently losing bus cycles every time a display memory access is made. By providing a separate video display memory, the terminal processor does not lose any bus cycles during screen refresh operations.

The central memory is of sufficient size to contain all programs and data required to support the terminals. A portion of the central memory may be allocated for the use of each terminal.

In the data processing system just described it is of course necessary to update the information stored in the terminal video memory from time to time in order to update the information displayed on the screen, for example, in response to keyboard input at the terminal or in response to a message transmitted to the terminal from another terminal in the system. As mentioned above, it is desirable to minimize the time that the central processor and the terminal processor are in use. The present invention minimizes this time by providing circuitry in the LVC which detects changes in the contents of the central memory allocated to any given terminal and subsequently transmits only the changed information to the terminal.

In this manner, the workload on the central processor and the terminal processor is kept in a minimum. In addition, since primarily only changes (except for initial loading) in the central memory are transmitted to the terminal, rather than entire data blocks, the bandwidth of the communications channels between the central system LVC and the terminals is minimized. Thus relatively more terminals can be supported by a single central system. This also allows relatively inexpensive, low-grade communications channels, such as non-dedicated telephone links, to be employed, thereby increasing the commercial value of the system, since remote terminals can be used with the system. Such remote terminals, in the system described herein, do not require dedicated high-grade cables.

The present invention provides the above advantages. In addition, the LVC change detect circuitry of the present invention is capable of handling video update operations in a system employing video terminals which utilize multiple independent video display areas. For example, in a preferred embodiment of the present invention each terminal can support up to 8 independent display segments, each of which can be defined by the user and each of which displays information without interference with adjacent display segments.

BRIEF SUMMARY OF INVENTION

Accordingly, it is an object of the present invention to provide an improved terminal communications controller.

It is also an object of the present invention to provide an improved terminal communications controller which comprises circuitry for detecting any change in the portion of central system memory assigned to a terminal and for transmitting the changed information to the corresponding terminal display.

It is a further object of the present invention to provide an improved terminal communications controller as described above which is capable of supporting a terminal which contains multiple independent video display segments.

These and other objects are achieved in accordance with a preferred embodiment of the invention by providing in a data processing system comprising a central processor, a central memory, a communications controller, and a terminal communicating with the central processor and central memory through the communications controller, the improvement comprising change detect circuitry associated with the communications controller for detecting any change in the information stored in the central memory space allocated to such terminal and for transmitting the changed information to such terminal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a block diagram illustrating a data processing system utilizing the local video controller (LVC) of the present invention.

FIG. 2 is a block diagram illustrating the terminal circuitry utilized by the present invention.

FIG. 3 is a representation of a segmented video display screen.

FIGS. 7A and 7B are a detailed block diagram illustrating the DMA logic of FIG. 6B.

FIG. 8 illustrates the format of a unit control block (UBC).

DETAILED DESCRIPTION OF THE INVENTION

Table of Contents

Figure 4:
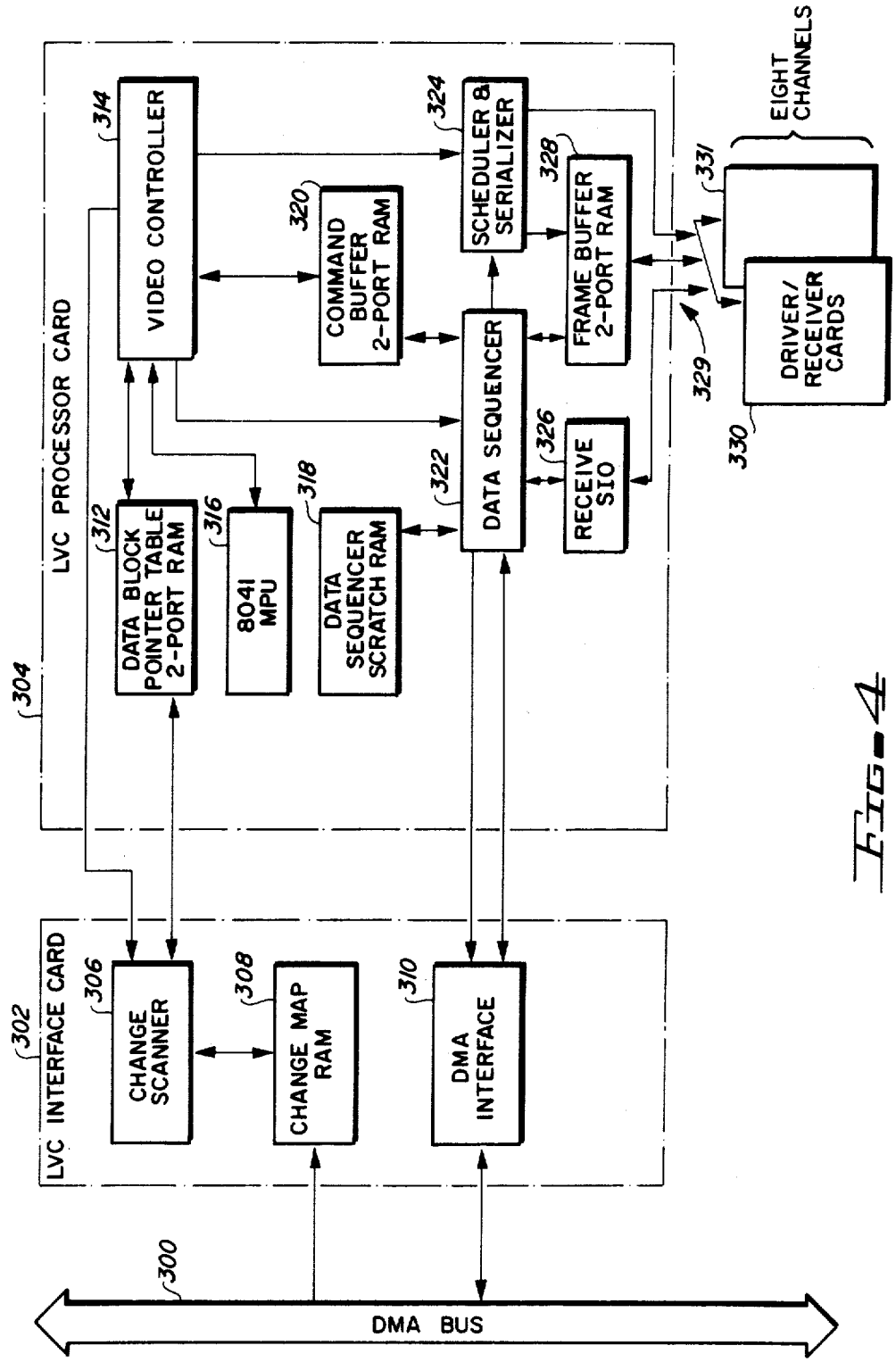
FIG 4 is a block diagram illustrating the major functional components of the LVC.

GENERAL DESCRIPTION OF DATA PROCESSING SYSTEM
GENERAL DESCRIPTION OF LVC AND TERMINAL
TERMINAL PROCESSOR CIRCUITRY
TERMINAL VIDEO GENERATOR CIRCUITRY
LVC ARCHITECTURE
LVC BASIC DATA STRUCTURES
CENTRAL PROCESSOR/LVC COMMANDS
LVC PROCESSOR CIRCUITRY
LVC INTERFACE CIRCUITRY
LVC DRIVER/RECEIVER CIRCUITRY
LVC COMMANDS
LVC/TERMINAL INTERFACE PROTOCOL
LVC DATA FLOW

GENERAL DESCRIPTION OF DATA PROCESSING SYSTEM

FIG. 1 is a block diagram illustrating a data processing system utilizing the video memory controller of the present invention. The data processing system comprises central processor (CPU) 2, main memory 4, and local video controllers (LVC) 6 and 8. CPU 2, memory 4, and the LVC's 6 and 8 are interconnected by means of data bus 10, address bus 12, and control bus 14. It will be understood that these busses actually comprise plural conductors, and that they have been illustrated as single lines merely for convenience of illustration. LVC 6 is shown coupled to terminals 20-23 via channel 30, which actually comprises data, address, and control lines. LVC 8 is shown coupled to terminals 25-27 via bus 32.

The data processing system may be configured in many different ways and for many different purposes, including, for example, a multi-user, multi-tasking office system.

GENERAL DESCRIPTION OF LVC AND TERMINAL

The LVC serves as a communications controller for conducting bidirectional communications between the central system, comprising CPU 2 and memory 4, and one or more terminals. In a preferred embodiment, each LVC can control up to 8 different channels. In FIG. 1, LVC 6 is shown as having channels 30, 33, and 34. Each channel can control up to 8 different terminals. Thus, in a preferred embodiment each LVC can control up to 64 individual terminals.

Each terminal may include a keyboard for operator entry of data and commands, and a video display for communication with the operator by the data processing system.

Each LVC, which may be up to 10,000 feet away from CPU 2, transmits data from video data blocks in memory 4 to the local terminals using a high speed synchronous protocol. The video data blocks are sent over a coaxial or twisted pair cable at the rate of over 60,000 bytes per second. Only changed data is transmitted, to reduce the transmission bandwidth. This data is buffered, checked, formatted, and displayed at the terminal. The terminal also buffers keystrokes from its associated keyboard and transmits this data to the LVC when polled by the LVC.

Each local terminal receives data and command information in 192 byte message frames from the LVC. Keystrokes are buffered at the terminal and labeled with the terminal address and an identifier tag code. Status messages and auxiliary device inputs are labeled with different identifier tags to distinguish them from the terminal's keyboard.

The terminals are provided with programmable screen dimensions. Screen sizes as large as 33 rows by 132 columns (line printer width) or 64 rows by 96 columns (typewriter page) are available. They also utilize expanded attributes (reverse video, blinking characters, cursor position, and underscore).

In addition, expanded character sets and character descenders are available. Alternate character sets and user-defined character fonts may be downloaded from the CPU 2. Business (character mosaic) graphics are also available.

By means of segmented video displays, independent files and applications may be viewed on the same screen without interference. Refer to FIG. 3 which illustrates a screen 140 divided into 4 working segments. Cursor types and attributes may be assigned on a segment basis. Each screen segment is from a separate data block in memory 4 and may be independently controlled. Several attribute systems can be selected, vertical scrolling of individual segments is possible, and the segment display size is programmable. Two character sets of 256 characters each can be provided, and the available attributes include blanking, blinking, brightness, reverse video, and underlining. The height, width, and position of each segment within the viewing area are set by a DEFINE SEGMENT command sent to the terminal by processor 2.

DEFINE SEGMENT and REDEFINE BORDER commands from CPU 2 may be used to cause the terminal firmware to automatically draw a border around any segment. The border will be drawn in the character positions adjacent to the segment. Software chooses appropriate start row and column parameters in the DEFINE SEGMENT commands used to construct the screen. These parameters ensure that at least one character separates adjacent segments. Borders may be shared among segments. Six codes in each character set are reserved for drawing borders around segments. These characters are the upper left and right corners, lower left and right corners, and horizontal and vertical sides.

TERMINAL PROCESSOR CIRCUITRY

FIG. 2 is a block diagram illustrating the terminal circuitry. The terminal circuitry includes two basic circuit boards. One contains the terminal processor 40. The other, known as the video generator circuitry, contains the video memory circuitry 50, character generator circuitry 60, and CRT deflection circuitry 70.

The terminal processor circuitry 40 in FIG. 2 comprises the terminal microprocessor (MPU) 110, read only memory (ROM) 112, random access memory (RAM) 114, direct memory access (DMA) controller 106, interrupt controller 108, and four serial input/output ports, namely serial I/O port A (120), port B (124), port C (104), and port KSIO (116). I/O port KSIO communicates with keyboard 118. Port A controls a serial printer 122. Port B may control an optional serial device such as a badge reader, optical character reader, ticket printer, touch screen, mouse, etc. Port C is used to couple the terminal circuitry to the central system. Either an RS-423 interface 101 or a coaxial cable interface 102 may be selected by means of switch 103.

The terminal processor 110 is a Z80-based microprocessor and provides interfaces to the printer 122, to the keyboard 118, and to the display's video RAM memory 88. The terminal processor 110 also provides the intelligence and memory needed to buffer, check, and process data and commands sent to or from the LVC.

Serial I/O port C (104) is operated in a half duplex synchronous byte oriented mode. It generates an interrupt at the beginning of each message frame. The MPU 110 programs a DMA transfer to the processor RAM input buffer, and at the end of this transfer, the DMA interrupts and the MPU checks for transmission errors (CRC). At this time, if the CRC was good and the terminal has been polled for input, the XDMA (transmit DMA) channel and port C are used to transmit an input message to the LVC. When port C interrupts upon completion of the input message transmission, the MPU reprograms port C to interrupt at the beginning of the next output message frame.

While the next output frame is being DMA'd to the next frame buffer, the MPU 110 processes the previous frame if its CRC was good and the message header indicates that the message was destined for this terminal. If the message contained video data, a VDMA (video DMA) transfer is started from the frame buffer to update the video RAM 88. If the message was a terminal command, it is processed by the MPU. If the message contained data for the printer, a PDMA (printer DMA) transfer is started from the frame buffer to the printer's I/O port 120.

Keyboard inputs arrive via port KSIO, which is programmed to operate in a low speed asynchronous mode. Printer status information causes an interrupt from I/O port KSIO. The terminal firmware may also generate status messages. Keystrokes and status messages are merged and buffered for later transmission by the XDMA channel and port C.

The RAM 114 is used to hold the downloaded firmware used in normal operation and for optional peripherals. The RAM also provides temporary storage for stack and other variables, video channel communications buffers, command buffers, and control tables.

The ROM 112 contains self-test diagnostics which are run every time that the terminal is powered up, or upon request by the user. The ROM 112 also contains bootstrap routines which are used to download the terminal software package, or any other desired software package (such as a CP/M operating system) into the RAM 114. Once the RAM 114 has been downloaded, almost all of the software operates out of the RAM 114.

The DMA controller 106 has four channels. Two channels are used to support the port C COAX interface option. The third DMA channel is used to support video, disk, line printer, or voice data transfers. The last DMA channel is used to support port A or port B transfers (typically, a serial printer on port A).

In a preferred embodiment, the DMA is an AMD 9517A-4 DMA chip.

TERMINAL VIDEO GENERATOR CIRCUITRY

Still with reference to FIG. 2, the terminal video generator circuitry is contained on one circuit board and includes three basic parts—video memory 50, character generator 60, and the CRT deflection circuits 70. The three parts commumicate with one another via the terminal data bus 11 and the video timing bus 16.

Video memory 50 includes a video memory controller 80, a display controller 82, a 2:1 multiplexer 83, a word/byte demultiplexer 84, a video data register 86 which in a preferred embodiment takes the form of a first-in/first-out (FIFO) register, the video RAM's 88, and display data registers 90.

The character generator circuitry includes video timing clocks 92 whose outputs are distributed to the various other circuit blocks as required, a field attribute decoder 93, character register 94, attribute register 95, character downloader 97, character generator RAM 96, character generator 98, and attribute generator 99.

The CRT deflection circuitry includes sweep circuits 130, deflection and high voltage (HV) circuit 132, cathode drive circuitry 134, and the cathode ray tube (CRT) display 136.

Still referring to FIG. 2, the video memory controller (VMC) 80 and FIFO register 86 communicate with the terminal data bus 11 to get character data to be displayed on the CRT display 136, load it into the video memory 88, and send it to the video character generator circuitry 60 and CRT deflection circuitry 70. The video character generator circuitry takes the character data coming over the character data bus 91 and generates the desired dot pattern to form the particular character. Different character sets are possible, so that any given character can be represented on the screen in different fonts. In addition, the video character generator circuitry includes attribute circuitry which imposes any of several desired attributes on the character, such as reverse video, blinking video, intensified video, etc.

The video memory 88 contains the ASCII (or modified or extended ASCII) codes and attribute information for data to be displayed on the screen.

The character downloader 97 enables a complete character set to be downloaded from the terminal data bus 11 into the character generator RAM 96. New character sets may be downloaded at any time at the user's option. The character generator RAM 96 contains the bits that define the dot patterns for characters to be displayed on the CRT display 136. In the absence of any attributes that might modify the displayed dots, a one is stored in the character generator RAM 96 for a visible dot, and a zero is stored for no dot.

The field attribute decoder 93 decodes that portion of the character word specifying the attributes, and the attribute generator 99 applies the corresponding attributes to the character dot pattern read out of the character generator RAM 96.

The progress of character data through the terminal circuitry to the display screen will now be described. When a message of display information is received by the terminal, it is stored into RAM 114 by the terminal MPU 110. When the message has been validated, it is sent to the video RAM 88. Certain commands are sent to the VMC 80 and FIFO 86, setting up the operation, and a DMA operation to the FIFO 86 is initiated. The FIFO 86 buffers the data and grabs video RAM 88 cycles during retrace blanking to feed the data into the video RAM 88. The size of FIFO 86 (three 24-bit words) is designed to be sufficient to keep up with the data flow while only operating during the video retrace times. Other operations are also supported at retrace time, such as moving video memory data to and from FIFO 86 for vertical scrolling, and accessing selected characters to and from the video RAM 88 via FIFO 86 for implementation of a blinking cursor character.

The addresses for the loading of the video RAM 88 are generated by the VMC 80, as are the addresses for reading the video RAM 88. At display data times (i.e., times other than horizontal and vertical retrace blanking) 24-bit video display character words are read out of the video RAM 88 at a rate of several per microsecond, with the exact rate determined by the size and shape of the screen. These characters are fed to the character generator circuitry 60 to be checked for parity and to get the attributes, and to determine the video display character. Addresses are input into the character generator (CG) RAM 96 memory, which contains display character information formatted to generate 16 display scan lines each 9 bits wide. The CG RAM 96 is organized as 9×16K plus parity. The 14 to 16 bits for addressing this memory array come 8 bits from the character value in the display character word, 2 to 4 bits from the character set (also from the display character word), and 4 bits from a CRT5037 video timer and controller chip (not shown) for the one of sixteen scan lines. These bits are multiplexed together and used to address the CG RAM 96 to read the 9-bit display character scan line, which is sent to the character generator 98. At the same time, the field attribute decoder 93 will have determined which attributes are to be applied for this display character, which attribute signals interact with the display character in the appropriate manner before the data is sent to the CRT display 136.

Reference may be had to the above-cited inventions for a more detailed description of the terminal video generator circuitry.

LVC ARCHITECTURE

The LVC is essentially a communications controller that uses a specialized protocol to conduct bi-directional communications between the central system and terminals or other "devices" that dwell on a local network.

Referring to FIG. 4, the LVC possesses two external interfaces, the DMA bus interface 300 and the channel interface 329. The DMA bus 300 is used for communications between the LVD and central system. The local channel interface 329 is used for communications between the LVC and terminals or other devices. Each LVC can control up to eight local channels.

Each device on an LVC channel may have up to four satellites, or sub-devices, that are addressable from the central operating system. Sub-devices may be separate units of equipment or component blocks of a single device. A printer attached to a cluster controller or a floppy disc drive on a terminal are each examples of a sub-device.

The LVC can support 64 video terminals in such a manner that the central CPU 2 need not issue I/O commands for terminal CRT refresh. The LVC allows terminal display areas to reside anywhere in memory 4, as long as each terminal is assigned to a separate memory mapper logical address window.

Each terminal's video display area is dynamically relocatable under software control. Up to eight separate video display areas, or segments, may be assigned to each terminal.

The terminal video display refresh is accomplished under LVC control. Central memory areas assigned as video display segments are divided into 64 word blocks, and each block is mapped to a change table 308. Each time a memory write occurs within one of these blocks, that status is recorded in the change table 308, and the LVC routes the changed block to the corresponding terminal.

Some of the information to be sent to terminals is of a non-repeating nature, such as commands, character fonts, etc. Data of this type is transmitted as a "one-shot" essage. In this mode, the data is only sent once in response to a specific software I/O command.

LVC BASIC DATA STRUCTURES

As mentioned above the LVC directs communications between the central system and its devices. An LVC communicates with the central CPU on the central DMA data/address busses 10, 12. Each LVC is an independent controller and has a unique address on the DMA address bus. The DMAC instruction (described below) is used to send control information to the LVC and to read status from it.

A "video channel" is the communications link between an LVC and its devices. One LVC supports eight video channels with up to eight devices on each channel. A "device" is any equipment which can communicate with an LVC through a channel. Examples of devices are terminal/keyboards and cluster printer controllers. A "sub-device" is any equipment connected to and controlled by a device. Examples of sub-devices are printers and voice communications equipment.

Addresses are used by software to communicate with an LVC, devices, and sub-devices. Various types of component addresses include:

1. Controller address—This eight bit address is used by software to select one LVC controller with the DMAC instruction.
2. Channel address (CHA)—A channel address is a three bit value selecting one of the eight cables attached to an LVC.

3. Poll address (PA)—This three bit number is the address of a device on a particular channel. This address is used by an LVC to a poll a device. Each of the possible eight devices on a channel has a unique poll address. This number is assigned to a device by DIP switches or jumpers allowing any device on a cable to have an arbitrary Poll Address.

4. Sub-device address (SDA)—This two bit number identifies one of the sub-devices sharing a single tap on one of the eight channels on an LVC.

The physical device address (PDA) of a (sub-)device is an eight bit number unique for each (sub-)device controlled by an LVC. The PDA is used by the software to direct all commands to a (sub-)device and identifies the (sub-)device sending data and status to software. The physical address of a (sub-)device is made up as follows:

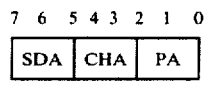

where:
CHA: Channel address. Addresses one of eight channels from an LVC.
PA: Poll address. Addresses one device (or tap) of the selected cable.
SDA: Sub-device address. Addresses one of the (sub-)devices sharing a cable tap. The main device (normally a video terminal) is always addressed with an SDA of zero.

A "data block" (DB) is used to move display or other data from central memory 4 to devices. Data blocks are always addressed using a 23 bit logical address (an eight bit window address and a 15 bit logical address within that window). A data block can reside anywhere in memory 4 but must not cross a window boundary. The maximum size of a data block is 16,384 words.

There are two types of data blocks with differing modes of transmission from central memory 4 to the LVC: Repeat Data Block and One Shot Data Block (described below).

When changes to a data block are to be automatically sent to a device attached to the LVC, the data block is called a "repeat block". Repeat blocks in general are video refresh buffers. Repeat blocks, data blocks, and segments all mean the same thing when the block is used as a video refresh buffer (in repeat mode).

If the data block is to be transmitted once, upon request, the block is called a "oneshot block". The term "segment" is a video terminal word. Segments look like repeat data blocks to the LVC. A repeat block can be made to temporarily look like an ordinary area of central memory by executing the Suspend Repeat Block Transmission command.

The terminal's "Define Segment" command is an extension of the following "Define Repeat Block" command:

| | 0 1 2 3 | 4 5 6 7 8 9 10 11 | 12 13 14 15 | 16 17 18 19 20 21 22 23 |
|---|---|---|---|---|
| 3 | 1 RR | UCBS | RR | 11BH |
| 4 | RR | | | PDA |
| 5 | DATA BLOCK POINTER ||||
| 6 | DATA BLOCK SIZE IN BYTES ||||
| 7 | (NOT LOOKED AT BY THE LVC) ||||
| 8 | | | RR | DBN |

The unreserved part of word 8 (9th word of the UCB) other than the DBN, and the remaining 7 UCB words, varies depending on a particular devices's implementation. The LVC manipulates data blocks on change detect block boundaries. In other words, the data block implicitly begins and ends on an 0100 word memory boundary.

The DBN, data block number, must be unique on a given channel. If a data block number is already assigned for a channel, the LVC will reject the Define Repeat Block request with a status code of 67H without sending the UCB to the device.

To cancel a repeat block definition, a UCB structured like the one shown above is sent to the LVC. The command code is 21CH. The data block pointer and data block size words are ignored. If the repeat block is defined, the LVC sends the cancel request to the device at PDA.

A "unit control block" (UCB) is four or more words of control information for an LVC and/or a device. Software initiates transmission of a UCB to an LVC with the DMAC instruction. The maximum size of a UCB is 16 words. During transmission from the LVC to a device, the entire UCB is copied into an outbound message and sent very much like a one shot data block. The term "command block" is used synonymously with UCB. UCB's may be linked together to form a UCB chain.

A "change detect block" (CDB) is a 64 word portion of central memory 4 aligned to a 64 word boundary, i.e., the low-order six bits of both the physical and the logical addresses of the first word of a CDB are zeroes. Based upon logical addressing, each LVC monitors every possible CDB of the central memory 4 logical memory space for write operations. If a CDB is part of a repeat data block for a particular device, then a store into the CDB will cause the block to be marked for subsequent transmission to the appropriate channel. All devices on the cable watch for CDB's from their repeat data blocks.

Since an LVC monitors the 23 bit logical address to detect modifications in a CDB, it is permissible for two or more data blocks to share the same physical 64 word portion of memory provided they are always addressed using different windows, or the data blocks are destined for devices on different LVCs.

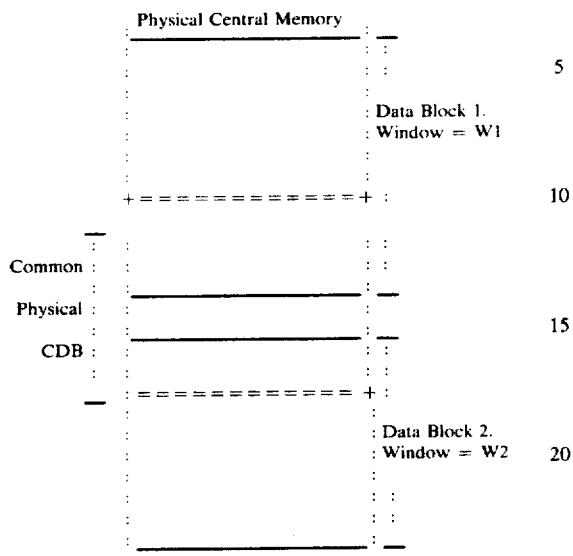

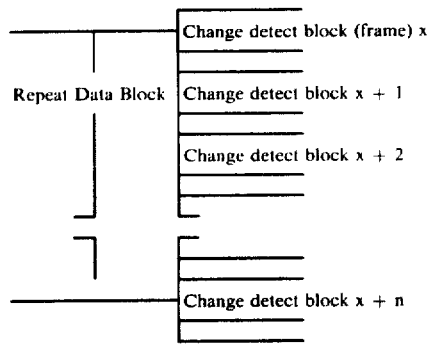

Whenever the Common Physical CDB is written into using window W1 in the address, the LVC will transmit the common CDB as part of data block 1 to the device programmed to receive data block 1. If window W2 is used to address the CDB, it will be sent to the device which expects data block 2. Thus repeat blocks can share the same physical CDB, if different logical address spaces are mapped to the same physical page or if any two repeat blocks using the same logical addresses are processed by different LVC's.

The change detect block is the unit of resolution of the repeat data block. Each 64 word block in central memory is represented by a single bit in the LVC change map RAM (308 FIG. 4). This bit is unconditionally set by a write (CPU or DMA controller) to any word within the 64 word block.

When a repeat data block is assigned to a terminal by system software, the LVC divides it into change detect blocks and monitors the change map RAM 308 for changes in the repeat data block. When a change occurs it is routed to the correct terminal, and the change bit is reset.

If the starting or ending address of a repeat data block is not on a change detect block boundary, the entire starting and ending 64 word block is still refreshed after a change. It is the terminal's responsibility to ignore changes outside the repeat data block.

The change detect block is equal in size to the data in an outbound message on the cable, which is called a message frame, or simply frame. The terms frame and change detect block are used synonymously.

Data in change detect blocks x and x+n that is outside the address boundaries of the repeat data block is sent by the LVC, but ignored by the terminal.

A "message frame" is one unit of information transmitted by an LVC on a channel or a device. It contains 192 data bytes preceded by a four byte header and followed by a two-byte CRC. (During cable transmission, the message frame will have at least six sync bits prefixed and at least two pad bytes appended.) A frame may comprise either control information (e.g., a UCB) or data. The header and CRC are generated by the LVC; the data usually originates in central memory 4 and is transferred to the LVC over the DMA channel.

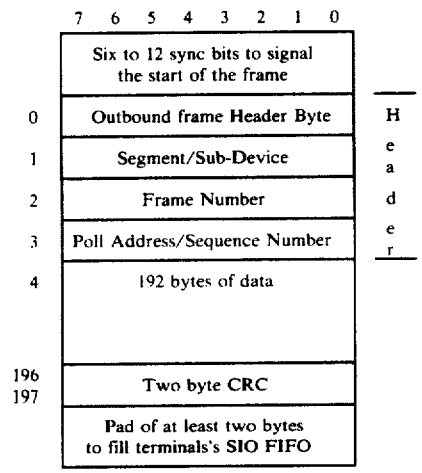

Format of an Outbound Message Frame

To send data or code to a (sub-)device, the software provides an LVC with the addresses and sizes of the data block as well as the (sub-)device address and some additional control information. The LVC divides the data block into one or more message frames and transmits one frame at a time to the (sub-)device. The format of the data or code block depends upon the particular operation being performed.

As mentioned above, the LVC supports two modes of data transmission to (sub-)devices: Repeat mode and One Shot mode. The transmission mode is selected by the software, but it is constrained to match the expectations of the terminal command being issued.

In repeat mode, one (logical) memory block is transmitted to a device each time its content is changed. This mode is intended for video devices (but not restricted to them). For the terminal, each such memory area is displayed in a user defined portion of the video screen called a segment. There can be up to eight segments simultaneously being updated on the terminal screen.

In order to minimize the actual volume of data transmitted to a terminal, the LVC's monitor every CDB of each repeat data block and transmit a CDB whenever an LVC detects a change in it. If a CDB contains some data which is not a part of the displayed segment, the device must discard the extraneous data.

Since a changed CDB is only sent to (at most) one device by an LVC, a repeat block must not overlap another of that LVC's repeat blocks (within the same logical addressing window) as shown below.

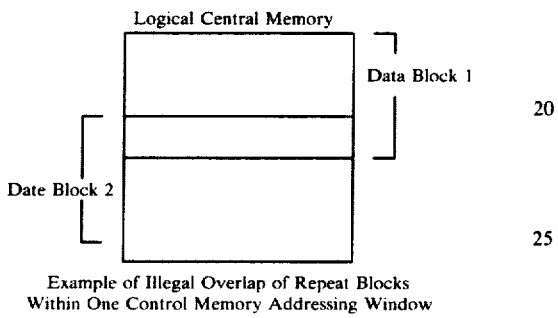

Example of Illegal Overlap of Repeat Blocks
Within One Control Memory Addressing Window Furthermore, two of an LVC's repeat data blocks in the same memory window may not include any parts of a common CDB. This is equivalent to the restriction that whenever two segments supported by a single LVC have their repeat data blocks in the same address space (window), there must be a boundary between them whose address is a 64 word multiple.

In One Shot mode, a data block is transmitted once to the addressed device upon software command. This mode is intended for printers, down-loading the character set RAM, etc., although it can be used for video data via the SCROLL SEGMENT command. Software must retain the data block in memory until it has been completely transmitted. Completion of the transmission is normally determined by requesting a Command Done interrupt in the command that outputs the One Shot data block. Reuse of the data block for other purposes is then prohibited until the interrupt is received.

Devices may only send data to the LVC in response to a poll. Such data falls into three categories: (1) keystroke data from keyboards, (2) non-keystroke data from (sub-)devices like OCR or magnetic stripe readers, and (3) status including diagnostic memory/error-log dumps. The data/status is returned via inbound messages.

Software passes control information either to an LVC or to its devices in unit control blocks (UCB's). The DMAC instruction is used by software to initiate transfer of UCB's to an LVC or to read single-word status. Software may independently request acknowledgement of command receipt and/or command completion. An overview of the steps taken during command processing follows:

1. Software executes a DMAC (Start I/O) instruction to select an LVC and to supply the address of a UCB to an LVC.
2. If the LVC hardware is free to transfer the UCB, it accepts the DMAC instruction; otherwise, the DMAC is rejected.
3. The LVC hardware copies the UCB from central memory 4 to an internal buffer and notifies the LVC firmware.
4. The LVC firmware moves the command from the read buffer to a command queue in the LVC memory, freeing the read buffer. The LVC hardware is then able to read the next UCB of the chain or accept another DMAC (Start I/O) instruction to read another UCB chain. On the last UCB in a chain, the LVC firmware interrupts the CPU with the chain taken status (if requested).
5. The LVC firmware determines the type of the command and processes it accordingly. There are three types of commands based upon how they are processed:
   a. Controller Only commands—These are commands processed completely by an LVC. SET INPUT RETRY THRESHOLD and ASSIGN KEYSTROKE BUFFER are examples of this type.
   b. Controller and Device commands—These commands are processed partially by an LVC and partially by a (sub-)device. Usually these supply the LVC with the address of a Data Block that is to be transmitted to a device and tell the device what to do with it. DEFINE SEGMENT and LOAD CHARACTER SET RAM are examples of this type.
   c. Device commands—These commands are processed completely by a device. BLANK DISPLAY and REDEFINE BORDER are such commands.
6. Except for Controller Only commands, the LVC schedules transmission of the complete UCB to the device. For commands with one shot data blocks, the LVC firmware also schedules transmission of the frames containing the one shot data.
7. The device performs the desired operation (possible passing all or part of the UCB and/or data on the sub-devices).
8. After processing, the device sends a completion status back to the LVC. Along with the completion status is a copy of the UCB address and a flag indicating whether or not the UCB requested a command done interrupt.
9. The LVC posts the completion status in control memory 4, and if requested, signals completion via a comand done interrupt.

The operative word of the DMAC instruction is as follows:

| | 0 1 2 3 4 5 6 7 8 9 10 11 12 13 14 15 16 17 18 19 20 21 22 23 |
|---|---|
| w0 | CMND \| RR \| UN \| CA | where:
RR—Reserved. Must be zero.
UN—Unit Number. All DMAC instructions issued to the LVC are issued to Unit zero.
CMND—DMAC Commands. The command codes in binary are as follows:
0000—Start I/O. Initiates transfer of a UCB chain to the LVC. The starting address of the chain is in the second word.
001—Load Controller Parameters. This command must be executed before attempting to use the LVC.

The second DMAC word has the following format:

```
 0 1 2 3 4 5 6 7 8 9 10 11 12 13 14 15 16 17 18 19 20 21 22 23
|FD|FA|LP| RE-    | PRIORITY | RE-    | RETRY |
|  |  |  | SERVED |          | SERVED | COUNT |
```

FD = Force Data Parity Error—Setting this bit high causes bad parity on subsequent data transfers.

FA = Force Address Parity Error—Setting this bit high causes bad parity on subsequent address transfers.

LP = Load Priority. Initially, all DMA controllers have a priority of 0. Before any attempt is made to send UCB's to an LVC, the controller's priority should be set (LP = 1; PRIORITY field = new priority (smallest number = best service)).

RETRY COUNT—This is the number of times the LVC will attempt to DMA dta to/from the MOD III before it reports an error. The default value is 3.

0010—Set Keyboard Buffer Free. Software executes this command when it has finished processing a keystroke buffer.
0011—Reserved.
0100—Stop I/O. If the LVC is reading a UCB chain it will terminate at the end of the current UCB.
0101—Reserved.
0110—Reserved.
0111—Reserved.
1000—Input Interrupt Status Word 2.
1001—Input Interrupt Status Word 2.
1010—Input LVC Status Word.
1011—Input LVC Identification Register.
1100—Reserved.
1101—Reserved.
1110—Master (system) Reset. The LVC terminates the current UCB chain immediately, aborts all communications with attached devices, then begins performing non-destructive diagnostics. All LVC error logs are preserved.
1111—Initiate Power Up Sequence. The LVC immediately aborts all activities and begins executing power on diagnostics. Software polls the LVC's Status Register for either a self diagnostic failure indication or "waiting for downline load" status.

The general format of a UCB is as shown in FIG. 8, where:

C: Command Completed. This bit is set once the command processing is completed. If the I bit was set, a command done interrupt is also generated.

S1, S2: Auxiliary status information for a small number of commands; otherwise, rr.

CS: Completion Status. The command completion code is returned here. An LVC may post a completion status without forwarding the command to a terminal for Controller Only or erroneous Controller and Device commands. Such completion statuses will be in the range zero through 127. The possible values of CS are allocated as follows:

| CS (decimal) | Meaning |
|---|---|
| 0 | Command completed normally. |
| 1 | Unknown command code |
| 2-63 | Reserved for errors common to DMA controllers. |
| 64-127 | Reserved for LVC use. |

-continued

| CS (decimal) | Meaning |
|---|---|
| 128-255 | Reserved for devices. |

I: Done Interrupt request. Setting this bit requests that the command completed status be accompanied by an interrupt.

UCBS: UCB Size. The Length of the significant portion of the UCB in central memory words. A UCB is a minimum of four words in length and a maximum of 16. If a UCB sent to a terminal is shorter than expected, all omitted parameters will have an assumed value of zero.

CCODE: Command Code. This tells the LVC's and devices want to do. To a programmer, this appears as one 12 bit code, but the LVC's and the devices interpret different parts of it as described below. The reason for this is to make LVC actions independent of device actions to as high a degree as possible.

```
       12 13 14 15 16 17 28 19 20 21 22 23
CCODE: |    LC       |       CC        |
``` where:

LC: LVC Code. This part tells the LVC what to do. The values of LC are:

LC = 0. The command is completely processed by the LVC. OC is the Command Opcode. There are no LC = 0 terminal commands.

LC = 1. First send the UCB to the device. The device must either acknowledge or reject the command with a special response IDT. If the device accepts the UCB, then repeatedly send the Data Block described by the UCB. OC is the opcode for the device. DEFINE SEGMENT is the only LC = 1 terminal command.

LC = 2. Stop Sending the repeat block identified by the UCB. Send the UCB to the device. OC is the opcode for the device. CANCEL SEGMENT is the only LC = 2 terminal command.

LC = 3. First send the UCB to the device. Then send the Data Block described in the UCB once. OC is the opcode for the device. The LVC insures that the device receives the UCB before it starts receiving the frames comprising the data block. The terminal one shot commands are: DOWNLOAD SUBDEVICE, SCROLL SEGMENT, DOWNLOAD CHARACTER SET RAM, and TRANSMIT DATA BLOCK TO SUBDEVICE.

LC = 4. Send the UCB for processing to the device. OC is the opcode for the device. Most terminal commands fall into this category.

LC = 5-15. Reserved.

***This six-bit field is used by the LVC to identify repeat data blocks when sent to the device. Therefore, a unique value must be assigned to every repeat data block that travels on one channel. This field is required for commands of type LC = 1 and 2 only. The low order six bits of word 8 of the UCB must be formatted as follows:

```
18 19 20  21 22 23
┌─────┬──────┐
│ SEG │  PA  │
└─────┴──────┘
```

SEG: Segment Number. An arbitrary three bit value assigned by software to identify each repeat data block to a given device.

PA: Poll Address. An identification of which device on a particular LVC cable is to process repeat data (segments). This value should be identical to the corresponding bits of word 4 of the UCB, the PDA.

PDA: Physical Device Address. The PDA identifies the UCB's recipient.

The "data block number" (DBN) is an identification tag used by the LVC and devices to discriminate between different repeat data blocks. Data block numbers are assigned to a particular device and the assigned device will accept only data blocks assigned to it.

When transmitted by the LVC, data is divided into 64 word messages. This applies to both one-shot and repeat data blocks. The "frame number" is attached to each of these types of messages to identify the data frame's relative position within a repeat or one-shot data block. The frame number is an eight bit field, so the maximum number of frames in a data block is 256.

A "message" is a packet of information traveling on the cable between the LVC and devices. It consists of a message header and text. Messages are either outbound or inbound, relative to the LVC.

The "header" is the first part of a message. It contains information necessary for the LVC or device to interpret the message. It also contains fields used for the communications protocol between LVC and device. There are two types of headers, outbound message and inbound message headers.

The outbound message information field is always 64 words long, or 192 bytes. Outbound message information is either control information or data.

The inbound message information field is always 8 bytes long. It may be data or status information. There are two categories of data, keystroke and non-keystroke data. There are two categories of status, solicited and asynchronous.

As mentioned earlier, the message header contains addressing information, polling information, and error recovery sequence numbers. Outbound headers also contain control information which categorizes the associated information field of the message; hence they are longer than inbound message headers. The outbound message header is a 4 byte field. The inbound message header is a 2 byte field.

Outbound message headers indicate (1) the type of message (command message, repeat data block, one-shot data block, or dummy message), (2) the destination of the message body, and (3) the poll address of one of the eight channel devices which is to respond with an inbound message after the outbound message is successfully received.

Additional information in the header indicates which frame within a data block is being sent. All outbound message headers also contain a message sequence number which is used in a positive acknowledgement system for outbound error recovery.

The outbound message itself is 192 bytes long. It is composed of either a command (a UCB followed by pad characters) from a buffer in the LVC, repeat or one-shot data from a 64-word block of main memory 4, or a dummy message containing filler characters. (Dummy blocks are used to maintain channel cycle timing when no valid message is available.)

The format of the outbound message header is shown below in Z80 microprocessor byte format.

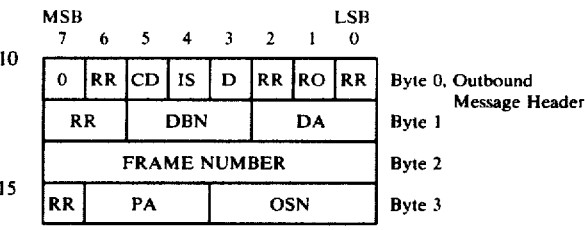

where:

Bit 7=0, indictes an outbound frame; this enables devices to distinguish outbound messages from inbound messages.

RR: Reserved.

CD: Command/Data flag.
  CD=1 command message frame
  CD=0 data message frame

RO: Repeat/One-shot flag.
  RO=1 repeat data block message frame
  RO=0 one-shot data message frame D: Dummy message flag. D=1 dummy message, indicating there is no data to transmit. The data that is in this frame is ignored by all devices.

IS: Inbound sequence number. A one bit sequence number that is used as a means of positive acknowledgement of each inbound data frame. The LVC inverts the bit if the inbound transfer is successful; otherwise the device repeats the message on the next poll.

DBN:DA: Data block number and destination device address. The lower three bits of this field always contain the device address. For repeat data frames, the upper three bits of this field contain the data block number that identifies which data block (segment) the message frame belongs to. In the case of one shot data, the DBN:DA field is the device address corresponding to the intended recipient of the message frame. Only the least significant three bits of this field, corresponding to the polling address of the device, are used. The high order bits are zero.

FRAME#: If the RO bit=1, this field indicates which part of a repeat data block is being sent in the message. A message contains a 64-word frame, and a repeat data block consists of one or more frames.

PA: Poll Address. This specifies which device on the channel will reply with an inbound message. Every device must have one of eight unique polling addresses on a channel.

OSN: Outbound Sequence Number. A sequence number is assigned consecutively to outbound messages (modulo 16). This is used as a means for positive acknowledgement to verify that the last outbound messages are received by a device without error.

The protocol used by the LVC and devices is a half duplex, byte oriented synchronous protocol that is very similar to bisynchronous communications protocols.

Both outbound and inbound message frames have the same general format. The frames consist of a sync field, header field, information field, 16 bit CRC, and pad characters.

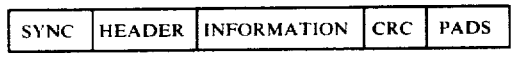

The information field contains commands, data, status, or dummy information.

The outbound information field is always 64 24-bit words long, or 192 bytes, which is the size of a video change detect block. Even if an outbound message is a dummy message, a 192 byte information field is sent that is an old message left in the frame buffer. Command messages contain a maximum of 16 words in the information field. The rest of the field contains an old message, as in a dummy message.

The inbound message information field is always 8 bytes long. If a device is polled by the LVC and it has no data to send to the LVC, the device must still have an 8 byte information field in its reply. If the device has less than 8 bytes of data, it must still send an 8 byte information field.

The LVC and devices always send pad characters (01H) at the end of any message. This is necessary in order to shift the 16 bit CRC remainder through the receiver so that the integrity of the message can be verified. The LVC always sends 2½ pad characters after each outbound message. The LVC pad timing is fixed by the scheduler/ serializer 324.

CENTRAL PROCESSOR/LVC COMMANDS

The most significant central processor/LVC commands will now be described.

In the command formats shown below Word0 to Word2 of the UCB are omitted. Words 5 to 7 are omitted whenever they are not used. All numbers followed by the letter H are hexadecimal. All unused and reserved fields within the UCB's must always be zero.

NOP

The NOP command is received and processed like any other LVC command except that no operation is performed by the LVC. Completion status and a completion interrupt (if requested) are generated in the usual manner.

Download LVC

Before the LVC can respond to the Download LVC command, it must be reset and the LVC's Controller Status Register must indicate that the LVC is waiting for a downline load. This Download LVC command transfers object code from central memory to the LVC RAM. The data block containing the code must be aligned to a 64 word boundary. Software must wait for a command complete interrupt before proceeding further.

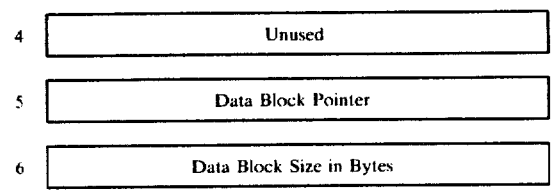

Each 64 word portion of the data block containing code must be formatted as follows:
 byte 0..1—RAM address where code is to be loaded.
 byte 2—Number of bytes of code. Maximum 188.
 byte 3..191—Code followed by 1 byte of checksum.

The last 64 word portion of the data block will specify the execution address as follows:
 byte 0..1—Execution address
 byte 2—00H
 byte 3—Checksum The checksum is the half add (Exclusive Or) of all bytes preceeding the checksum byte in the frame.

If the execution address byte pair is binary zero, the LVC's download monitor will return to a "ready for download" state (rather than transferring control to the downloaded code). This allows the LVC to be downloaded in segments that are smaller than the total amount of code to be downloaded.

Suspend Repeat Block Transmission

This command will cause the LVC to suspend transmission of a repeat block on the channel even if it notices a change in any CDB of the block. The command is used by software to freeze a display segment in a video device while it is doing major changes in it.

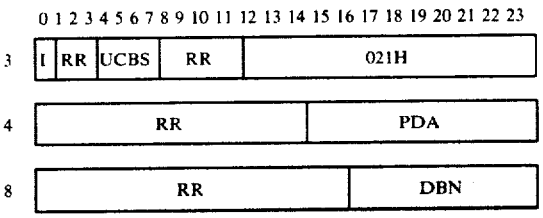

Resume Repeat Block Transmission

This command reverses the effect of the SUSPEND REPEAT BLOCK TRANSMISSION command. All changes to the block that occurred after the SUSPEND command was completed will now be detected and acted upon by the LVC.

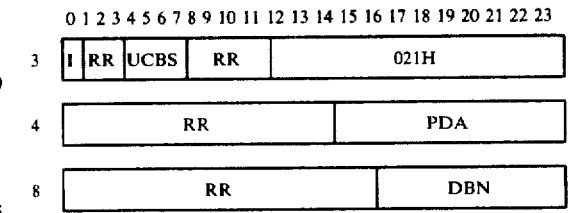

Each 8 byte Device Status Table entry has the format:

| | K I D | S I D | O F L | W B R | T X O | ? ? ? |
|---|---|---|---|---|---|---|
| BYTE 0 | | | | | | |
| BYTE 1 | INPUT RETRY THRESHOLD ||||||
| BYTE 2 | INPUT RETRY COUNTER ||||||
| BYTE 3 | OUTPUT RETRY THRESHOLD ||||||
| BYTE 4 | OUTPUT RETRY COUNT ||||||
| BYTE 5 | MISSED POLL RETRY THRESHOLD ||||||
| BYTE 1 | MISSED POLL RETRY COUNT ||||||
| | O N L | | | | | I S N | where:

KID, SID—Keystroke/Status Input Disabled. A "Disable Input From Device" command is in effect for this device.

OFL—The device is offline.

WBR—The device is in its initialization sequence after having recently come online. The two fields OFL and WBR combine to form this device state code:

| OFL | WBR | MEANING |
|---|---|---|
| 0 | 0 | The device is online in normal operating mode. |
| 0 | 2 | The device is online, has completed power on diagnostics, but hasn't sent the LVC's a boot request. |
| 1 | 0 | The device is offline. |
| 1 | 1 | The device is in its initialization sequence. |

TXO—Transmitter off. The device, after falling behind processing messages from the LVC, has sent an "XOFF" IDT sequence. The LVC is queueing all messages destined for the device. The device will send an "XON" IDT to the LVC when it can begin processing messages again.

Retry Threshold. The number of times to retry transmission errors of a given type.

Retry Count. The number of retries currently attempted to recover from a transmission error of the given type. The different types of retried transmission errors are:

Input—CRC errors on inbound (to the LVC) messages

Output—Requests from the device to retransmit a message. (sequence number retries).

Missed Poll—Times the device fails to respond to a poll from the LVC.

ONL—Online. The device is responding to polls and accepting messages within retry limit bounds.

ISN—Inbound Sequence Number. The next expected inbound sequence number from the device.

Read LVC Memory

This command dumps the LVC memory to the central memory buffer.

| 0 1 2 3 4 5 6 7 8 9 10 11 12 13 14 15 16 17 18 19 20 21 22 23 |||||
|---|---|---|---|---|
| 3 | I | RR | UCBS | RR | 029H |
| 4 | RR | | | LVC Memory Address ||
| 5 | Buffer Pointer |||||
| 6 | Buffer Size in Bytes |||||

LVC PROCESSOR CIRCUITRY

Each LVC consists of a set of three or four circuit cards (refer to FIG. 4). They are the LVC processor 304, LVC interface 302, and LVC driver receiver 330 and 331 (1 or 2 cards per controller).

The LVC processor 304 and the LVC interface 302 both reside on the CPU DMA bus 300.

The LVC processor 304 is the intelligent portion of the LVC. The intelligence is used to control the flow of information between the central system operating system, on the DMA bus side, and the devices, on the channel side.

The major component parts of the LVC processor 304 are the video controller (VC) 314, the data sequencer (DS) 322, the scheduler serializer 324, and the 8041 single chip microprocessor 316.

The video controller 314 is a Z-80 based microcomputer section of the LVC processor 304. In the hierarchy of intelligence that comprises the LVC, the VC 314 can be thought of as the master processor.

The VC 314 has control of the operation of the entire LVC, either directly or indirectly, through the use of its I/O lines and the B 2-port RAMS 312, 320, and 328. The data block pointer table 312, the 2-port RAM between the VC 314 and the change scanner 306, is used by the VC 314 to direct the change scanner's search for changes in active data blocks. The command buffer 320, the 2-port RAM between the VC and the data sequencer, is used by the VC to direct the data sequencer's message transmission activity. Hence both the data sequencer and the change scanner can be considered slaves of the video controller.

The VC 314 is isolated from the DMA and cable interfaces by the data sequencer 322. The software of the VC is not concerned with lower level protocol functions necessary to utilize the DMA and local cables, but instead depends upon the data sequencer to perform the necessary protocol activities.

The data sequencer 322 is a microprogrammed controller whose design, in a preferred embodiment of the invention, is based upon the AMD 2900 family bit slice architecture. The DS 322 is responsible for moving data through the LVC at the protocol level, under the direction of the video controller 314. The bit slice controller has an eight bit bidirectional bus.

On the DMA side, the data sequencer 322 is responsible for all data movement into an out of the LVC. The DS 322 must service all DMACs received by the LVC, except POR and Master Reset, which are hardware decoded. All UCBs, which are issued via the Start I/O DMAC, are passed to the VC for interpretation and action. Error recovery on the DMA bus is handled by the data sequencer without VC 314 intervention, unless the controller retry count is exceeded.

DS 322 responsibilities are similar at the cable interface. All outbound data to the devices is scheduled by the video controller, by way of the outbound header queue located in the command buffer 2-port RAM 320. The DS 322 processes the outbound tasks in this queue and fetches the assigned data through the DMA interface in order to assemble the outbound messages. The data sequencer puts these messages into the frame buffer 2-port RAM 328 where they are transmitted by the scheduler/serializer 324.

Inbound messages from the devices are sorted by the data sequencer 322 into two categories, keystroke and non-keystroke data. The DS immediately puts keystrokes into a specially defined keystroke buffer in main memory 4. Non-keystroke data is given to the video controller for subsequent interpretation and processing.

All cable error recovery is executed by the data sequencer. Like DMA error recovery, cable error recovery is transparent to the video controller until device retry count is exceeded.

The scheduler/serializer (SS) 324 is a block of state logic that functions as the control logic for the physical level of the cable interface. The SS generates all cable timing for the eight local channels attached to the LVC. It sequences in synchronization with the bit rate of the cables.

During each bit cycle, a sub-sequencer section of the SS 324 performs the operations necessary to move transmit messages, stored in the frame buffer 2-port RAM 328 by the data sequencer 322, into the transmit SIO's located on the driver receiver cards 330–331. In this sense, the SS is a DMA controller servicing eight high speed local communications channels.

Additional tasks of the SS sub-sequencer are to mark transmit message buffers after they have been transmitted, test for newly filled buffers, and label received messages with the source cable. During specific unused cycles, the SS 324 reads the revision level switches on the driver/receiver cards and returns the values to defined locations in the frame buffer 2-port RAM 328.

The 8041 MPU 316 is an independent microprocessor that connects the central system service processor to the LVC.

The 8041 MPU is connected directly to the VC Z-80 bus, and appears as an I/O port to the VC. The 8041 MPU 316 monitors the LVC for major failures and has the capability to issue a power on reset, a master reset, and set and reset a fail indicator LED on the LVC 304.

The data sequencer 322 consists of a micro-programmed 8-bit controller. It is implemented using two AMD 2901 bit slice IC's and a 2910 micro-sequencer to control the micro-program. Architecture features are a 72 bit wide micro-word, 2K word micro-program, and a 8-bit, bi-directional data bus.

LVC INTERFACE CIRCUITRY

Regarding the LVC interface 302, the set of controller cards that comprise a particular LVC derive their DMA address identity from the controller slot number of the LVC interface card. This is the only LVC card that communictes directly with the DMA bus 300.

The LVC interface 302 is partitioned into two distinct functional blocks, the DMA interface 310 and the change scanner 306. Each block operates as a slave to the LVC processor 304.

The LVC interface card 302 utilizes standard DMA interface logic. The DMA interface 310 consisdts of a 16 word register file (24 bits wide) (334, FIG. 7B) and four distinct state machines that execute the various DMA functions. The file registers utilized by the LVC are:

| File Address | Name |
|---|---|
| 6H | DMAC Opword 1 |
| 7H | DMAC Opword 2 |
| 9H | Interrupt Status Word 1 |
| 0AH | Interrupt Status Word 2 |
| 0BH | Controller Status Word |
| 0CH | Controller ID |
| 0DH | Interrupt ID |
| 0EH | DMA Read Data (from main memory 4) |
| 0FH | DMA Write Data (to main memory 4) |

The four state machines are:
Interrupt state machine
DMAC state machine
DMA state machine
DMA error state machine Support logic includes the DMA address register/counter 336, file data I/O buffers 338, and parity logic 342 on the DMA side.

Utilization of the DMA interface 310 on the LVC is the responsibility of the data sequencer 322. In general terms, the data sequencer 322 has an 8-bit bus, so it must pack and unpack 24 bit words to bytes as it uses the interface 310.

Figure 7A:
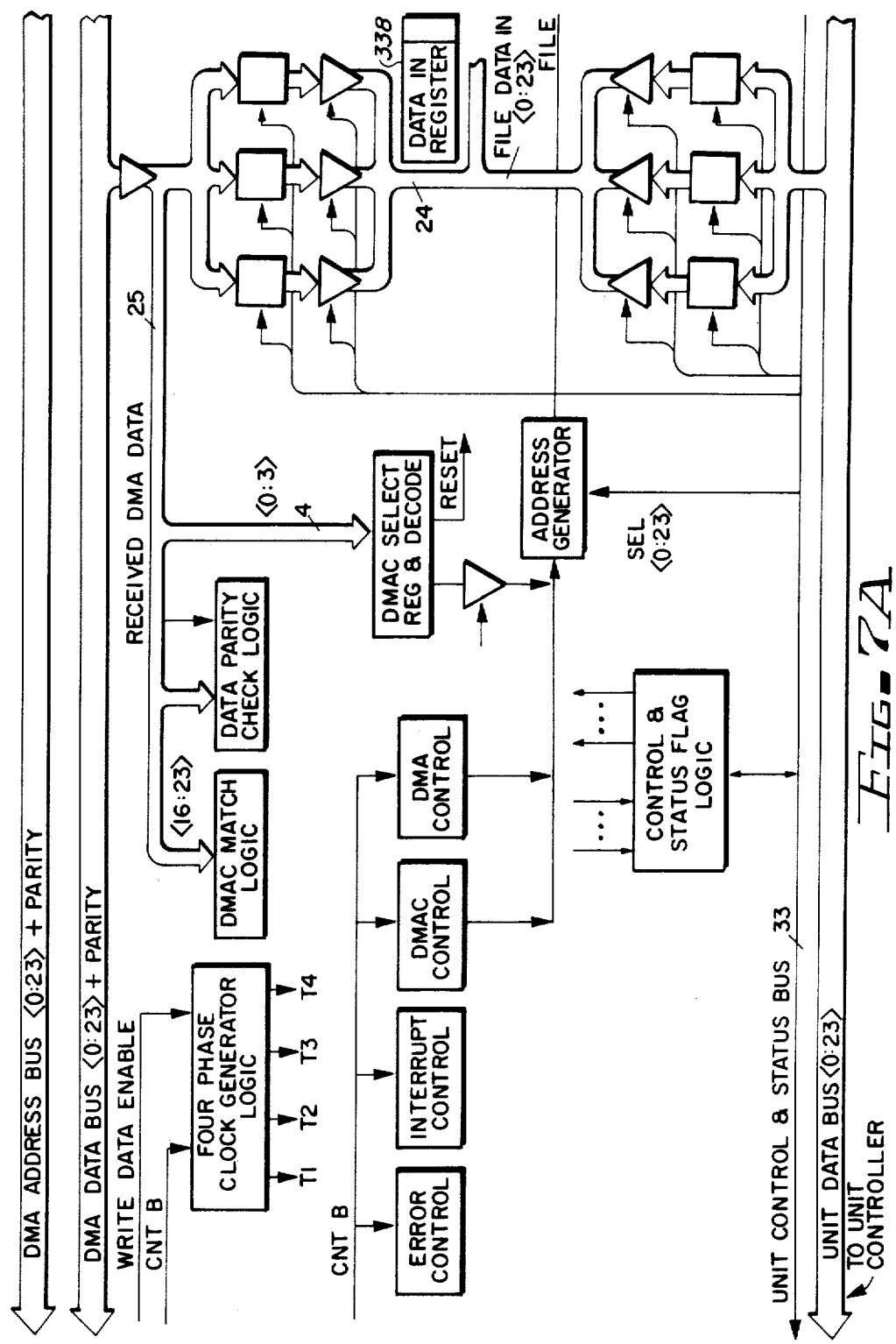

All data sequencer data moves in and out of the register file are performed through the 24 bit wide unit data I/O buffers (344, 346, FIG. 7B). Each single DMA transfer requires three address byte transfers, three data byte transfers, and several control cycles. The block DMA transfer capability of the DMA interface is not used. However, the data sequencer 322 can increment the DMA address register 336, so that when it must move blocks of data, it does not have to provide a new address for each word transferred.

Once the desired operation is initiated by the data sequencer 322, all physical level DMA protocol is performed by the appropriate DMA interface state machine. Task completion and error status are made available by the DMA interface so that the data sequencer 322 may perform its housekeeping and error recovery chores.

Figure 5A:
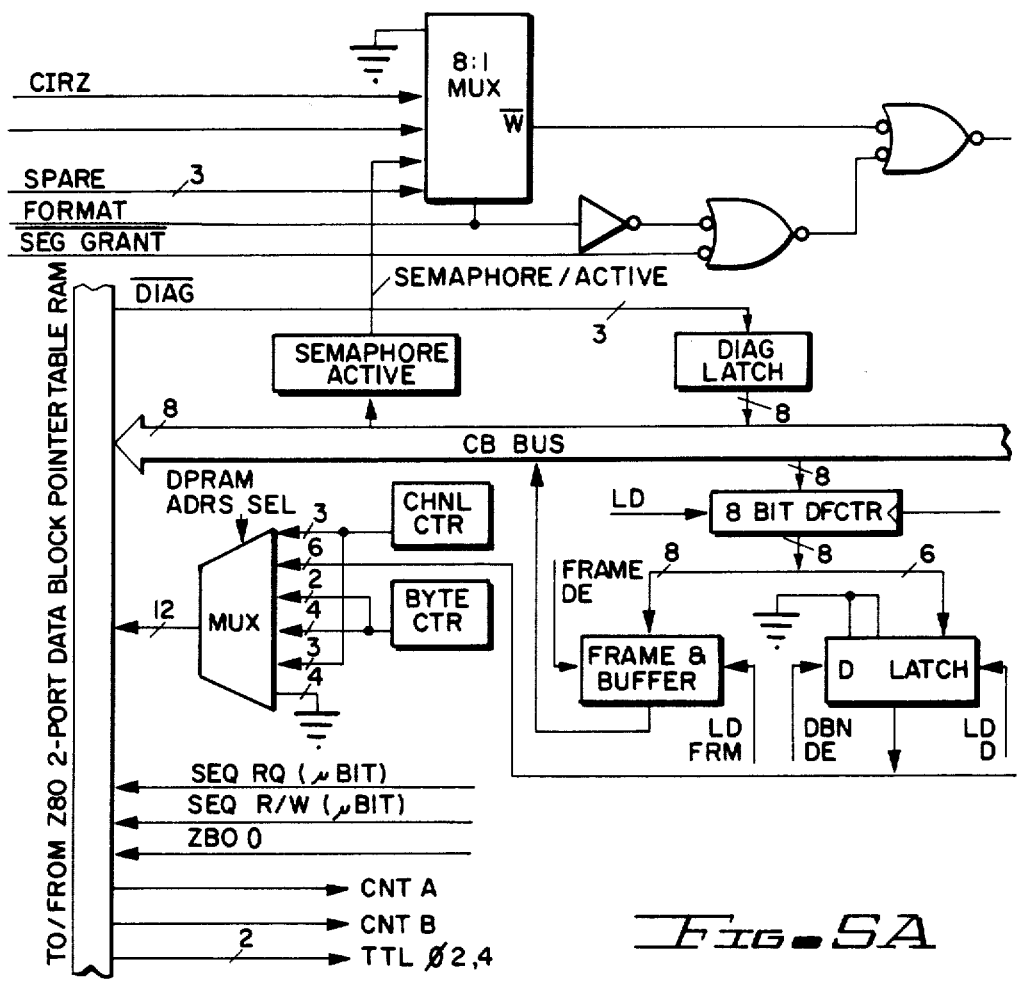
FIGS. 5A and 5B are a detailed block diagram illustrating the change scanner circuitry of the LVC.
Figure 6A:
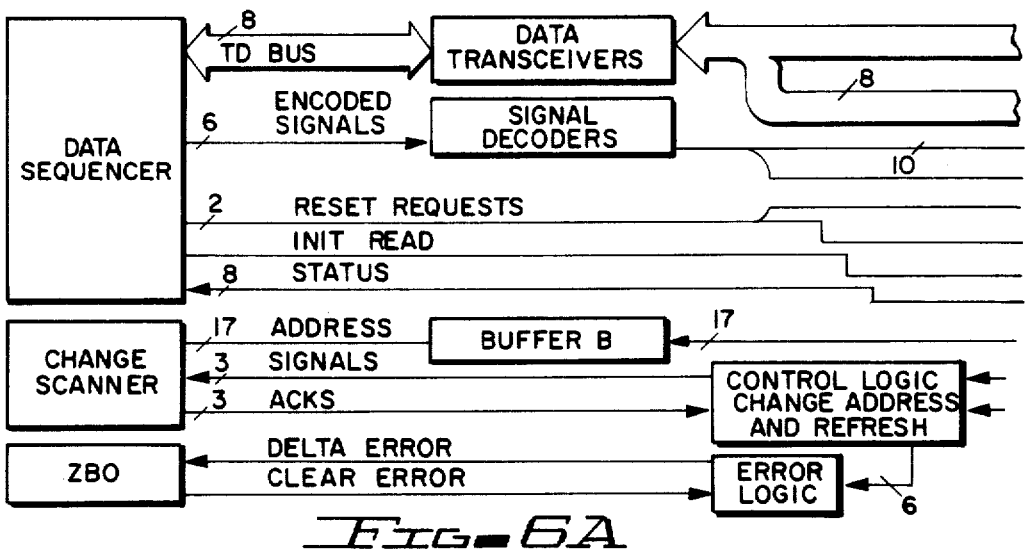
FIGS. 6A and 6B are a detailed block diagram illustrating the major functional components of the direct memory access (DMA) circuitry of the LVC interface.
Figure 5B:
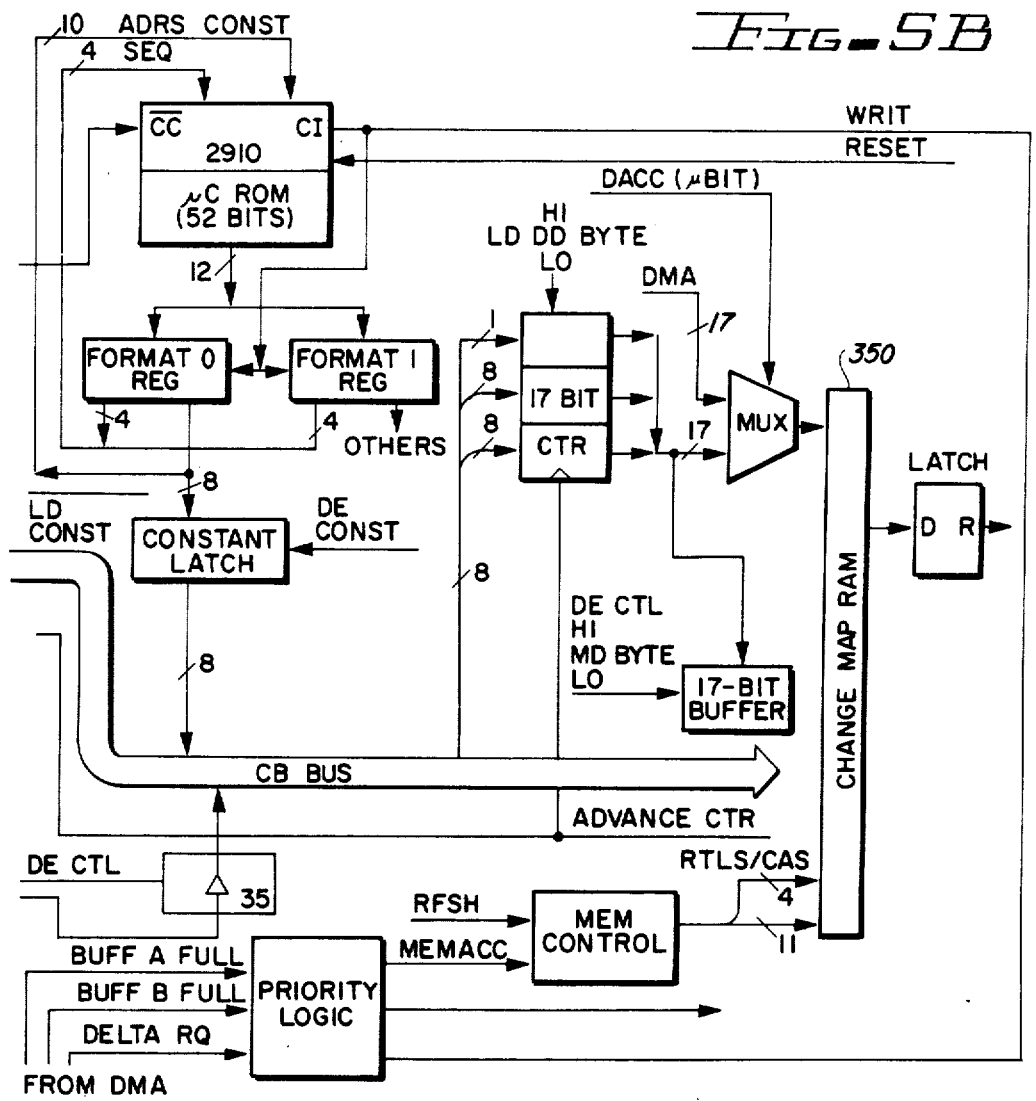
Figure 6B:
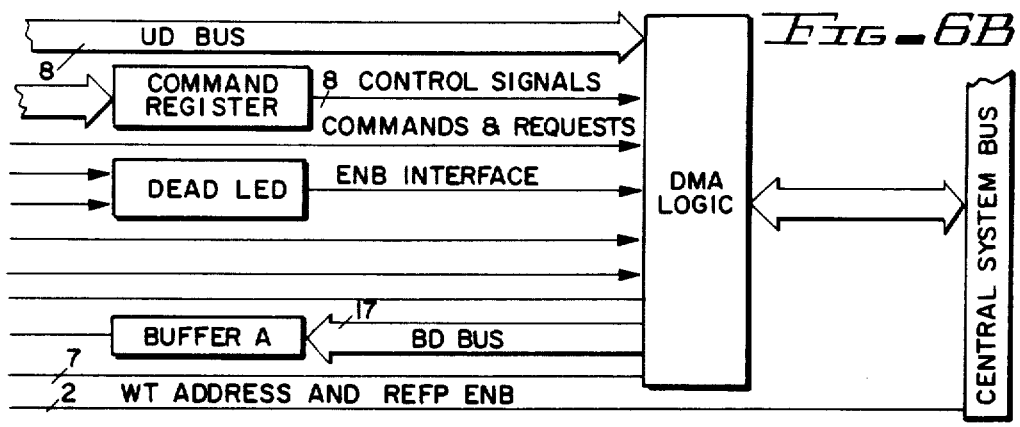

The change scanner 306, shown in greater detail in FIGS. 5A and 5B, enables the LVC to conditionally refresh terminal CRT's from any assigned locations in main memory 4 without the intervention of application software.

The change scanner 306 artificially partitions the entirety of main memory logical address space into 64 word "change detect blocks". The change scanner change map RAM 350 maintains a single status bit for each of these change detect blocks (128 kbits). By virtue of monitoring the 17 most significant logical memory address lines from the central memory mapper, the status bit represents the fact that a memory word anywhere within its respective change detect block has been modified by a memory write operation. CPU writes and DMA writes are not discriminated.

Using the Define Segment command, the central operating system must assign a data block (synonymous with segment) to a terminal in order to cause transparent refresh of the terminal's CRT. The data block is merely a contiguous collection of change detect blocks. The Define Segment command is interpreted by both the terminal and the LVC, and is utilized by the video controller 314 to direct the operation of the change scanner 306.

Communication between the VC 314 and the change scanner 306 occurs through the data block pointer table 2-port RAM 312. The VC assigns data blocks for the change scanner to monitor, based upon defined segments. The change scanner reports each change found to the video controller, so that it can be formatted and put into the transmit header queue for the data sequencer 322 to send to the terminal.

The change scanner format is such that each terminal may have up to eight display segments, or data blocks, assigned to it. The maximum length of any data block is 256 change detect blocks, equal to 16,384 words.

LVC DRIVER/RECEIVER CIRCUITRY

The LVC driver/receiver cards 330, 331 contain circuitry necessary to provide the physical interface between the LVC processor 304 and the local cables. Each card contains the circuitry for four local cables, so a fully configured LVC requires two driver/receiver cards.

The function of the driver/receiver card is to accept parallel data from the frame buffer 2-port RAM 328 and serialize the data. Serialization is accomplished with Z-80 serial I/O (SIO) devices. The data is further processed with a biphase encoder/decoder circuit (not shown), which encodes clocks into the data. Once encoded, the serial data passes through the line driver circuit to the cable and the devices.

The process is reversed for incoming data from the devices. The receiver circuit picks the serial data off the cable and presents it to the encoder/decoder for decoding. Once decoded, the serial to parallel data conversion is made in the receive SIO 326, which is located on the LVC processor.

LVC COMMANDS

This section summarizes LVC command procedures.

The LVC data sequencer 322 is responsible for interpreting and executing all DMA commands (DMAC's) issued to the controller, with the exception of those commands that are implemented directly by hardware. The data sequencer obtains issued DMAC's from the register file 334 in the DMA interface 310 located on the LVC interface card 302. The DMAC AVAIL status signal indicates the presence of a DMAC to the data sequencer 322.

DMAC's are serviced by the data sequencer on a status basis. If a command is outstanding and the central CPU 2 software attempts to issue another command, the LVC will not acknowledge it. This prevents overwrite of the previous DMAC until such time as it is serviced by the data sequencer 322.

DMAC's used with the LVC are, as previously defined, always a maximum two word command transfer. The first word is called the operation word. It has the format

| 0 | 1 | 2 | 3 | 4 | | 7 | 8 | | | 15 | 16 | | | 23 |
|---|---|---|---|---|---|---|---|---|---|----|----|---|---|----|
| IO | CMND | | RR | UNIT NUMBER | | | | | | | CONTROLLER # | | | | where:
IO—direction of operation. 0=Out: the data word or control word is sent from memory to the controller. 1=In: The second word is sent from controller to memory.
CMND—This is a command field which defines the operation to be executed by the controller as a result of the DMAC.
RR—Reserved, must be zero.
UNIT NUMBER—A field intended to be used to direct commands to a particular device. This is not implemented.
CONTROLLER #—This field selects the proper controller, based on the DMA bus slot number. The LVC slot number, or controller #, is defined by the slot that the LVD interface card is plugged into.

The Start I/O DMAC has a command field=0000, and the second word=the UCB pointer. The data sequencer 322 rejects the Start I/O DMAC if there is already one outstanding. Otherwise the data sequencer stores the UCB pointer in its scratch RAM 318 and sets a UBC available flag. The UCB available flag is tested by the DS microcode. The UCB is fetched by the DS and put into a UCB buffer in the command buffer 2-port RAM 320. It is the responsibility of the video controller to interpret the UCB and execute it or transfer it to a device.

Unit Control Blocks (UCB's) are the means by which all I/O devices are controlled by the central operating system. UCB's are issued to the LVC or its satellite devices with the Start I/O DMAC. The second word of the DMAC is a main memory logical address which points to the UCB. UCB's may be chained by inserting a pointer into a UCB that is the starting address for the next UCB in the chain. All UCB's are a minimum of 4 and a maximum of 16 24-bit words.

In the LVC, the responsibility for fetching and interpreting UCB's is shared between the data sequencer 322 and the video controller 314. When the Start I/O DMAC is issued, the data sequencer will decode the command and save the UCB pointer. Subsequently, the DS will test a location in the command buffer 2-port RAM 320 between the DS and VC to determine if the VC has allotted a free UCB buffer. If a buffer is available, the DS will fetch the UCB, put it in the buffer, and signal the VC that there is a UCB to process. If it is a single UCB transfer, the DS will then generate a UCB taken interrupt. If the UCB is chained, the DS will wait until the end of the chain before it generates the taken interrupt. The DS will not fetch another UCB until another buffer is made available in the command buffer 2-port RAM 320.

Once the UCB has arrived in the command buffer 2-port RAM, the video controller 314 tests the command for destination. The command can be intended for the LVD only, a device only, or both the LVC and a device can share commands. Device commands and shared commands are routed to devices with the physical device address field that is located within the UCB.

Completion status and completion interrupts are the responsibility of the device that the command is issued to. A device cannot deliver status and generate interrupts directly, but must do so through the LVC.

Device commands are routed through the LVC to the appropriate device using the physical device address. After the data sequencer 322 places the command into the command buffer 2-port RAM 320, the video controller examines the command for its ultimate destination. If the comand is destined for a device, a command header is generated by the VC and put in the transmit header queue for the channel that the device is located on.

The data sequencer is responsible for processing the transmit header queue for all channels. The command is obtained from the queue and a command message built by the DS. The outbound message is sent to the device over the local cable.

Command completion status and a completion interrupt is generated by the device processing the command. Upon completion of the command, the device sends completion status to the LVC. If the command indicates interrupt on completion, the device also requests a completion interrupt. The inbound status message from the device is received by the data sequencer and is routed to the video controller for processing. The video controller interprets the status message and directs the data sequencer to post completion status for the device. The video controller also directs the data sequencer to update its interrupt status registers and request an interrupt of the CPU 2, if that is indicated by the returned status.

LVC/TERMINAL INTERFACE PROTOCOL

The LVC sends commands to the terminal in command blocks. Each command block is contained in one message frame. Command blocks are processed in the same order that they are sent and received. The LVC commands are outlined below according to type.
Terminal Control:

The DOWNLOAD DEVICE command is used in the terminal initialization procedure and may also be used after initialization to add subdevice driver firmware or the download additional operating commands or features. The command points to a data block containing Z80 object code for the firmware to be downloaded. This data block is sent as a one-shot data block to the terminal and loaded as executable code.

The GET DEVICE TYPE command allows software to ask any channel device and its subdevices (if any) for their classes (terminal, printer, etc) and model numbers (or similar designation of available features). The device's reply is DMA'ed into a memory buffer.

The SET SCREEN SIZE command allows the height and width of the terminal display to be specified. Valid values for the horizontal terminal configuration are 12, 24, or 33 rows by 41, 81, 96 or 132 columns. Values for the vertical terminal are 12, 24, 33, 44 or 64 rows by 48, 81 or 96 columns.

The SET CHARACTER MODE command selects either the 8 or 24 bit character mode. This command also clears all segment definitions; it should be followed by one or more DEFINE SEGMENT commands. This command also selects the attribute system which will apply to the entire screen.

The SELECT KEYBOARD TYPE command allows selection of a numeric or function keypad and typewriter or keypunch mode shifting at the keyboard.

The BLANK/RESTORE DISPLAY command can be used to blank or unblank the screen, without interfering with video memory updates.

The ENABLE/DISABLE INPUT SUBDEVICE command controls transmission of inbound data from any terminal subdevice. Software may selectively enable/disable input subdevices.
Segment Control:

The DEFINE SEGMENT command positions the segment on the screen, informs the terminal of the segment size and shape, and selects the attribute family and the type of border displayed around the segment. Its parameters are:
  DBN: The data block number will also be the segment number.
  DB Width: The DB width must be equal to or greater than the segment width. A DB width of zero means no margin (DB width=segment width).
  AF: Attribute family code for this segment.
    OH=none or field attributes
    1H=attribute family #1.
  start row: The address of the screen row where the segment starts, not including any borders.
  start col: The address of the leftmost screen column of the segment, not including any borders.
  height: The number of rows-1 the segment is high, not including borders.
  width: The number of columns-1 the segment is wide, not including borders.
  border attributes: Defines the attributes of the border characters. Borders are optional.
  cursor character/attributes: Any displayable 24 bit character which is to be used as the cursor. It will be alternated with the character "beneath" the character position (24 bit mode only).
  cursor on/off rates: Define the rate and duty cycle of cursor flashing in 24 bit mode.

The CANCEL SEGMENT command is used to cancel the segment definition. An optional bit may select erasure of the segment data.

The SCROLL SEGMENT command initiates the vertical scroll of one segment. The parameters are the segment number, a signed integer which indicates the number of rows to be scrolled up or down, a pointer to the scroll data, and the length of the scroll data. The terminal scrolls the data in the video RAM for this segment by number of rows specified and updates the video RAM when the new data is received.

The REDEFINER BORDER command redefines the border attribute for a segment. The command is rejected if the original segment definition has no borders.

The REDEFINE CURSOR command changes the cursor character, attributes, and blink rate for the specified segment. If there was no cursor in the original segment definition, the cursor will be added.

The ENABLE/DISABLE CURSOR commands start and stop cursor blinking for a given segment.
Display Character Set Selection:

The DOWNLOAD CHARACTER SET RAM command loads a one-shot data block into all or part of a CG RAM character set (up to 256 characters). The DI (Done Interrupt request) may be used to inform software when it is safe to reassign the one-shot data block. The parameters are:
  CS: Character set RAM to be loaded.
  first character: The first character code (between 0 and FFH) in set CS to be loaded.
  data block size: DBS/8 will determine the number of characters loaded. Fractions of characters may not be loaded. If the data block size overruns the end of the character set, the remaining data will be ignored.

The SELECT DEFAULT CHARACTER SET command loads the default character set from the terminal processor ROM into the specified character set (0 or 1). The terminal automatically initializes the default character set at power on.
Subdevice Control:

The TRANSMIT DATA BLOCK TO SUBDEVICE command sends a one-shot data block to the named subdevice. This command is designed for printers and other optional output subdevices.

The RESUME TRANSMISSION TO SUBDEVICE and FLUSH SUBDEVICE BUFFERS commands are used for TRANSMIT DATA BLOCK TO SUBDEVICE error recovery.

LVC DATA FLOW

The LVC is a communications I/O device, and as such, its primary function is to move data between the central system and the devices. Data moves in two directions; outbound, from CPU to devices, and inbound, from devices to CPU. Different paths are taken through the LVC, depending upon the type of data, but all data moves in a similar fashion through the data sequencer 322.

Outbound data is categorized into three types: (1) repeat video data, (2) one-shot data, and (3) commands.

All outbound data types are processed and sorted by the Z80 video controller 314. The actual movement of data is accomplished by the data sequencer 322. The video controller uses a data structure called the transmit header queue in order to supervise the movement of data by the data sequencer.

The LVC possesses unique hardware and firmware which enables transparent refresh of CRT terminals. Control of transparent CRT refresh is accomplished with the data structure called the repeat data block. The repeat data block is a contiguous section of CPU logical address space that is assigned to a terminal as a video display area, using the define segment UCB.

Each repeat data block has a unique logical address that starts on an even boundary of 64. The address space may not cross window boundaries. The maximum size of a repeat data block is 256 change detect frames, or 16,384 CPU words.

A define repeat block UCB is the means by which the CPU initiates transparent refresh of any terminal. When the UCB is issued, parameters are extracted from the UCB by the video controller 314 before the command is forwarded to the terminal. These parameters enable the video controller to supervise the operation of the change scanner 306, and to route reported changes in change detect blocks to the correct channel and terminal.

The format of the define repeat block UCB is shown elsewhere herein.

The change scanner logic 306 performs the task of finding changes within repeat data blocks. The change scanner change map RAM 308 is a table 128K locations by 1 bit. The entire CPU memory logical address space is mapped to the change map RAM 308 by dropping the least significant 6 bits of logical address. The seventeen address lines left map directly to 128K. By virtue of deleting the least significant 6 bits of address, the resolution of the change map is 64 CPU words.

The access of a portion of physical main memory 4 used by the video system must be via only a single window and page combination if all changes are to be detected by the change scanner. If the mapping information controlling any window or page associated with a repeat data block is changed redefining the data block to the LVC, the result will be incorrect information displayed on the affected terminals.

All repeat data blocks should begin on addresses that are multiples of 64. This avoids the possibility that more than one repeat data block can be in the same 64 word change detect block. The change scanner will only report the change one time. If two devices share a change detect block, there is no assurance that the proper device will be updated.

The change scanner only looks for changes (bits set in change map RAM 308) at those locations defined by th define repeat block UCB. The video controller uses the define repeat block UCB to initialize the data block pointer table 2-port RAM 312 and thus control the change scanner.

The data block pointer table has a maximum of 512 entries, which is the product of 8 segments (repeat blocks) per terminal, 8 terminals per cable, and 8 cables. Each entry is four bytes long, so the table takes up 2K bytes in the pointer table 2-port TAM 312. The table is initialized and maintained by the video controller 314 in response to define or cancel repeat block commands. The format of an entry is given below.

| 7 | 6 | 5 | 4 | 3 | 2 | 1 | 0 | |
|---|---|---|---|---|---|---|---|---|
| F | VC SCRATCH | | | | | HBI | | Byte 0 |
| FRAME ADDRESS (MSB) | | | | | | | | Byte 1 |
| FRAME ADDRESS (LSB) | | | | | | | | Byte 2 |
| REPEAT BLOCK LENGTH, IN FRAMES | | | | | | | | Byte 3 | where:
- F=1; Tells the change scanner that the repeat block is defined and in service.
- F=0; No entry defined.
- HBI=The most significant bit of the starting address of the repeat block. Note that the total address is 17 bits. The least significant 6 bits are not used, since the change map has a resolution of 64 words.
- Frame address (MSB). The next 8 most significant bits of the starting address of the repeat block.
- Frame address (LSB). The least significant 8 bits of the starting address of the repeat block.
- Repeat Block Length in Frames. This field is the number of 64 word change detect blocks, or frames, in the repeat data block. The change scanner uses this number to determine how many locations it should scan in the change map RAM 308.

Entries in the data block pointer table may only be read by the change scanner, and entries are only valid if the flag bit=1. The video controller may cancel or temporarily suspend repeat block scanning and transmission by resetting the flag bit.

The data block number of an entry is implied by the relative position of an entry within the table. While not specified in the table, the data block number is returned to the video controller when the change scanner reports a change.

There are a total of eight data block change report registers, one for each channel. Only one entry is posted by the change scanner at a time; the register is busy until the video controller consumes the information that has been posted and frees the register for further reporting.

The change report register is 16 bytes long, and has the following format:

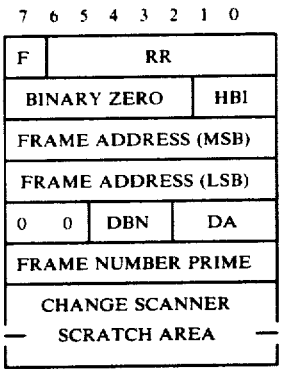

where:

F: Data available flag. The change scanner can only report a change if F=0. When it makes a report, the change scanner sets F=1. The video controller takes the change report when F=1, and sets F=0 when it has consumed the change report.

HBI: The most significant bit of the CPU repeat data block logical address. The next two bytes contain the rest of the 17 bit address. When a change report is made, the video controller appends the least significant 6 bits (=0) to the frame address to reconstitute the 23 bit logical data block pointer.

FRAME NUMBER PRIME: This is the relative number of the changed frame in a repeat data block. The actual frame number of the change detect block is computed by:

FRAME NUMBER=DATA BLOCK LENGTH—FRAME NUMBER PRIME where DATA BLOCK LENGTH is the number of frames in the repeat data block, obtained from the data pointer table 312.

It will be apparent to those skilled in the art that the herein disclosed local video controller with video memory update detection scanner may be modified in numerous ways and may assume many embodiments other than the preferred form specifically set out and described above.

For example, although in the preferred embodiment described above the change map and the data block pointer table are contained in independent memories running asynchronously, they could be in fact be combined into a single memory in a simplified version.

Further, it will be apparent that more than one data block change repoert register may be provided per channel.

Accordingly, it is intended by the appended claims to cover all modifications of the invention which fall within the true spirit and scope of the invention.

What is claimed is:

1. A data processing system comprising:
   a central processor;
   a central memory for storing information in the form of instructions and data, said memory comprising a plurality of change detect blocks;
   a communications controller;
   bus means coupled to said processor, memory, and controller for conducting address, data, and control information;
   a terminal coupled to said bus means and communicating with said central processor and central memory through said communications controller, said terminal comprising a video display which is segmented into at least two independent display segments, each segment having at least one change detect block assigned to it; and
   change detect circuitry coupled to said communications controller for detecting any change in the data stored in a change detect block assigned to said terminal, and for transmitting the changed data to said terminal, said change detect circuitry comprising:
   memory means comprising a change map, said change map comprising a plurality of memory storage locations, one for each of said change detect blocks;
   address monitoring means for monitoring the address corresponding to any memory write operation to one of said change detect blocks of said central memory corresponding to one of said display segments of said terminal and for causing a status indication to be stored in the one of said memory storage locations corresponding to said one change detect block; and
   means responsive to said status indication for transmitting to said one display segment of said terminal the data in said one change detect block.

2. The data processing system recited in claim 1, wherein each segment has more than one change detect block assigned to it.

* * * * *